(12) United States Patent
Talarico et al.

(10) Patent No.: US 11,277,883 B2
(45) Date of Patent: Mar. 15, 2022

(54) SCHEDULING ENHANCEMENTS AND HYBRID AUTOMATIC REPEAT REQUEST (HARQ) TIMING PROCEDURE FOR NEW RADIO (NR) UNLICENSED

(71) Applicant: Intel Corporation, Santa Clara, CA (US)

(72) Inventors: Salvatore Talarico, Sunnyvale, CA (US); Jeongho Jeon, San Jose, CA (US); Gang Xiong, Portland, OR (US); Hwan-Joon Kwon, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 393 days.

(21) Appl. No.: 16/406,528

(22) Filed: May 8, 2019

(65) Prior Publication Data
US 2019/0268971 A1   Aug. 29, 2019

Related U.S. Application Data

(60) Provisional application No. 62/716,785, filed on Aug. 9, 2018, provisional application No. 62/670,458, filed on May 11, 2018.

(51) Int. Cl.
*H04L 5/00* (2006.01)
*H04W 72/04* (2009.01)
(Continued)

(52) U.S. Cl.
CPC .......... *H04W 88/06* (2013.01); *H04L 1/1819* (2013.01); *H04L 5/0055* (2013.01); *H04L 5/0082* (2013.01); *H04W 16/14* (2013.01); *H04W 72/042* (2013.01); *H04W 72/0446* (2013.01); *H04W 72/14* (2013.01); *H04W 76/27* (2018.02); *H04L 5/0007* (2013.01); *H04W 72/1289* (2013.01)

(58) Field of Classification Search
CPC . H04W 88/06; H04W 16/14; H04W 72/0446; H04W 72/042; H04W 76/27; H04W 72/14; H04W 72/1289; H04L 5/0082; H04L 1/1819; H04L 5/0055; H04L 5/0007; H04L 5/0053; H04L 5/0094; H04L 1/1607; H04L 1/1822; H04L 1/1887; H04L 1/1614
See application file for complete search history.

(56) References Cited

U.S. PATENT DOCUMENTS

2018/0368137 A1* 12/2018 Yin ..................... H04L 5/0055
2019/0319823 A1* 10/2019 Akkarakaran ....... H04B 7/0408
(Continued)

*Primary Examiner* — Ashley Shivers
(74) *Attorney, Agent, or Firm* — Schwabe, Williamson & Wyatt, P.C.

(57) ABSTRACT

A network device (e.g., a user equipment (UE), or a new radio NB (gNB)) can process or generate a configuration of a multi-subframe scheduling signal to configure an unlicensed band transmission that comprises an hybrid automatic repeat request (HARQ) feedback or a plurality of time transmission intervals (TTIs). The unlicensed band transmission can be configured dynamically with a number of N subframes, N comprising an integer greater than one, based on a downlink control information (DCI) or a radio resource control (RRC) signaling, which comprises the one or more subframes of the multi-subframe scheduling signal.

19 Claims, 11 Drawing Sheets

(51) Int. Cl.
    *H04W 88/06*    (2009.01)
    *H04W 16/14*    (2009.01)
    *H04L 1/18*     (2006.01)
    *H04W 76/27*    (2018.01)
    *H04W 72/14*    (2009.01)
    *H04W 72/12*    (2009.01)

(56) References Cited

U.S. PATENT DOCUMENTS

| | | | |
|---|---|---|---|
| 2020/0059330 A1* | 2/2020 | Wong | H04L 1/1896 |
| 2020/0235891 A1* | 7/2020 | Lei | H04L 1/1822 |
| 2020/0337072 A1* | 10/2020 | Lunttila | H04L 5/0012 |
| 2021/0153180 A1* | 5/2021 | Park | H04L 1/00 |

* cited by examiner

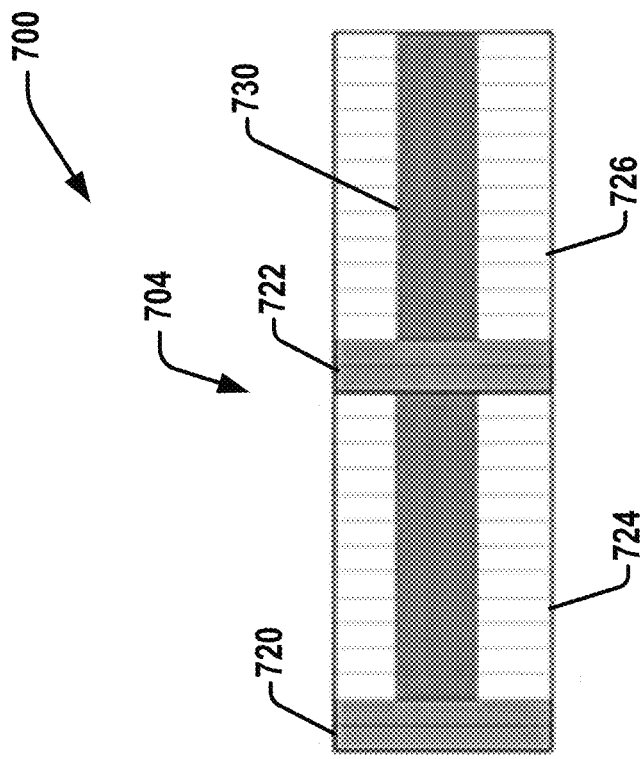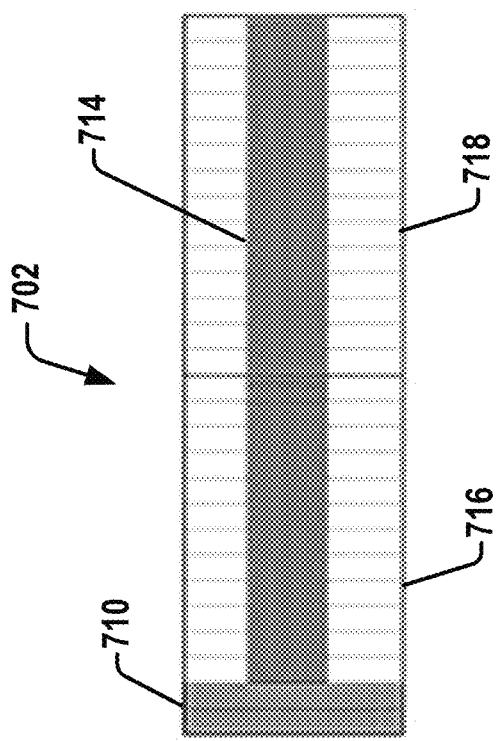
FIG. 7

| Fields | DCI format 0_0 (bits) | DCI format 0_1 (bits) |
|---|---|---|
| Identifier for DCI formats | 1 | 1 |
| Frequency domain resource assignment | $\left\lceil \log_2(N_{RB}^{UL,BWP}(N_{RB}^{UL,BWP}+1)/2) \right\rceil$ | $\left\lceil N_{RB}^{UL,BWP}/P \right\rceil$ if resource allocation type 0 $\left\lceil \log_2(N_{RB}^{UL,BWP}(N_{RB}^{UL,BWP}+1)/2) \right\rceil$ if resource allocation type 1, or for both resource allocation $\max\left(\left\lceil \log_2(N_{RB}^{UL,BWP}(N_{RB}^{UL,BWP}+1)/2) \right\rceil, \left\lceil N_{RB}^{UL,BWP}/P \right\rceil\right)+1$ |
| Time domain resource assignment | 4 | 1, 2, 3, or 4 |
| Frequency hopping flag | 1 | 0 or 1 |
| Modulation and coding scheme | 5 | 5 |
| New data indicator | 1 | 1 |
| Redundancy version | 2 | 2 |
| HARQ process number | 4 | 4 |
| TPC command for scheduled PUSCH | 2 | 2 |
| UL/SUL indicator | 0 or 1 | 0 or 1 |
| Carrier indicator | - | 0 or 3 |
| Bandwidth part indicator | - | 0, 1, or 2 |
| VRB-to-PRB mapping | - | 0 or 1 |
| 1st downlink assignment index | - | 1 or 2 |
| 2nd downlink assignment index | - | 0 or 2 |
| SRS resource indicator | - | $\left\lceil \log_2\left(\sum_{k=1}^{L_{max}} \binom{N_{SRS}}{k}\right) \right\rceil$ or $\left\lceil \log_2(N_{SRS}) \right\rceil$ |
| Precoding information and number of layers | - | 0, 2, 3, 4, 5, or 6 |
| Antenna ports | - | 2, 3, 4, or 5 |
| SRS request | - | 2 |
| CSI request | - | 0, 1, 2, 3, 4, 5, or 6 |
| CBG transmission information | - | 0, 2, 4, 6, or 8 |
| PTRS-DMRS association | - | 0 or 2 |
| beta_offset indicator | - | 0 or 2 |
| DMRS sequence initialization | - | 0 or 1 |

Table I - Summary of DCI format 0_0 or 0_1.

FIG. 8

SCHEDULING ENHANCEMENTS AND HYBRID AUTOMATIC REPEAT REQUEST (HARQ) TIMING PROCEDURE FOR NEW RADIO (NR) UNLICENSED

REFERENCE TO RELATED APPLICATIONS

This application claims the benefit of U.S. Provisional Application No. 62/670,458 filed May 11, 2018, entitled "SCHEDULING ENHANCEMENTS AND HARQ TIMING PROCEDURE FOR NR UNLICENSED", and the benefit of U.S. Provisional Application No. 62/716,785 filed Aug. 9, 2018, entitled "MULTI-TRANSMISSION TIME INTERVAL SCHEDULING IN NEW RADIO SYSTEMS OPERATING ON UNLICENSED SPECTRUM", the contents of which are herein incorporated by reference in their entirety.

FIELD

The present disclosure relates to wireless technology, and more specifically to scheduling enhancements and Hybrid Automatic Repeat Request (HARQ) timing procedures for New Radio (NR) unlicensed communications.

BACKGROUND

Each year, the number of mobile devices connected to wireless networks significantly increases. In order to keep up with the demand in mobile data traffic, changes can be be made to system requirements to meet these demands. Three areas, in particular, that need to be enhanced in order to deliver this increase in traffic are larger bandwidth, lower latency, and higher data rates.

One factor in wireless innovation is the availability in spectrum. To mitigate this, the unlicensed spectrum has been an area of interest to expand the availability of long term evolution (LTE). In this context, an enhancement for LTE in third generation partnership project (3GPP) Release 13 has been to enable its operation in the unlicensed spectrum via Licensed-Assisted Access (LAA), which expands the system bandwidth by utilizing the flexible carrier aggregation (CA) framework introduced by the LTE-Advanced system.

It is important to identify aspects of the design that can be enhanced for NR when operating in unlicensed spectrum. One of the challenges in this case is that this system must maintain fair coexistence with other incumbent technologies, and in order to do so depending on the particular band in which it might operate, some restrictions might be taken into account while designing this system. For instance, if operating in the 5 GHz band, a listen before talk (LBT) procedure is performed to acquire the transmission medium before a transmission can occur.

When a scheduled uplink (UL) transmission is to be performed, there are multiple contentions before this can occur. In fact, the user equipment (UE) has to first send scheduling request (SR) to the next generation NodeB (gNB), and once the request is received the gNB has to perform LBT before sending an UL grant, and finally once the UE has received the grant it has to perform LBT before accessing the channel. While this is a tedious procedure even when LBT does not need to be performed, LBT further increases latency and limits greatly the efficiency of the system especially if this procedure has to be repeated for every transmission time interval (TTI) transmission.

BRIEF DESCRIPTION OF THE DRAWINGS

FIG. 7 is a diagram illustrating an example of multi-subframe/slot/Time Transmission Interval (TTI) scheduling according to various aspects discussed herein.

FIG. 8 is a diagram of an example table that provides the supported channel bandwidth (CBW) at a given subcarrier spacing.

DETAILED DESCRIPTION

Figure 1:
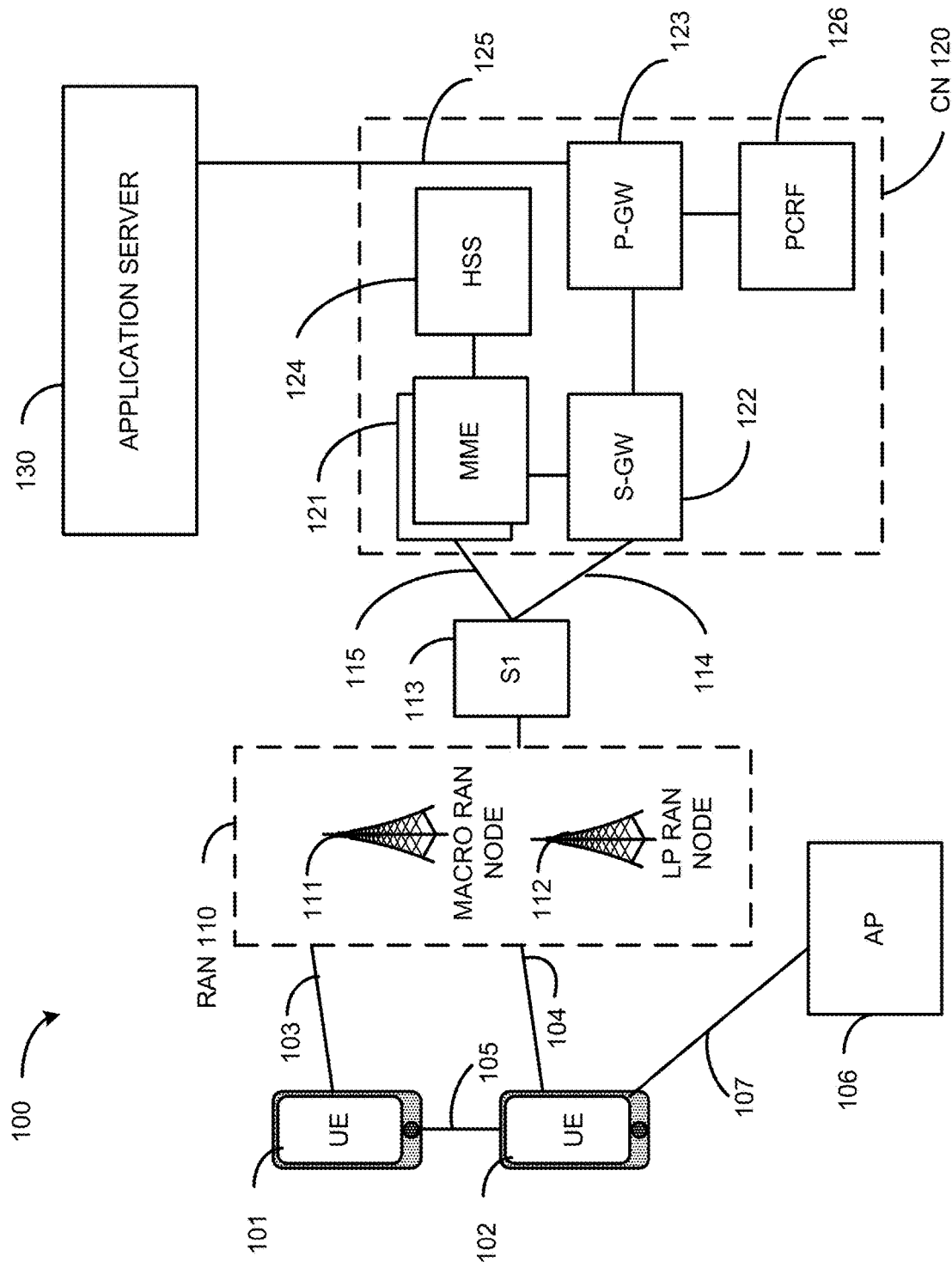
FIG. 1 is a block diagram illustrating an example of user equipment(s) (UEs) in a network with network components useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

In consideration of various deficiencies or solutions described herein, the present disclosure provides various embodiments/aspects for scheduling processes for Hybrid Automatic Repeat Request (HARQ) acknowledgement/negative acknowledgement (HARQ ACK/NACK) feedback, or UL transmission configurations (e.g., time transmission intervals (TTIs), or the like).

As building blocks for the framework of new radio (NR) become established, one enhancement is to enable NR to also operate on unlicensed spectrum. The work to introduce shared/unlicensed spectrum in fifth generation (5G) NR has already begun. Several objectives for NR-based operation in unlicensed spectrum include, but are not limited to, the following: 1. Physical channels inheriting the choices of duplex mode, waveform, carrier bandwidth, subcarrier spacing, frame structure, and physical layer design and avoiding unnecessary divergence in other work divisions; wherein unlicensed bands can be considered to belong to both below and above 6 Gigahertz (GHz), up to 52.6 GHz; or unlicensed bands above 52.6 GHz can be considered to the extent that waveform design principles remain unchanged with respect to below 52.6 GHz bands, and wherein similar forward compatibility principles made in the NR work items can also be considered; 2. Initial access, channel access. Scheduling/hybrid automatic repeat request (HARQ), and mobility including connected/inactive/idle mode operation and radio-link monitoring/failure can be considered; and 3. Coexistence procedures within NR-based and between NR-based operation in unlicensed and LTE-based LAA and with other incumbent radio access technologies (RATs) in accordance with regulatory requirements in e.g., 5 GHz, 37 GHz, 60 GHz bands. Coexistence procedures already defined for 5 GHz band in LTE-based LAA context could be assumed as the baseline for 5 GHz operation. Enhancements in 5 GHz over these methods should not be precluded. NR-based operation in unlicensed spectrum should not impact deployed Wi-Fi services (data, video and voice services) more than an additional Wi-Fi network on the same carrier.

Various aspects of the scheduling design that can be enhanced for NR when operating in unlicensed spectrum in order to ensure power efficiency, maintain fair coexistence, and reduce contentions. One of the challenges in this case is that this system should maintain fair coexistence with other incumbent technologies, and in order to do so depending on the particular band in which it might operate some restriction might be taken into account when designing this system. For example, if operating in the 5 GHz band, a listen before talk (LBT) procedure is performed to acquire the medium before a transmission can occur. For this reason, the scheduling procedure and the HARQ timing mechanism that are tight to specific timing and operation when operating NR in licensed band is to be enhanced and modified to accommodate for this constraint when performing transmissions on the unlicensed band. In order to overcome this challenge, this disclosure provides details on how to enhance the scheduling procedure and HARQ timing procedure of NR in order to allow an efficient way to operate in unlicensed spectrum.

Further, when a scheduled UL transmission has to be performed, there are multiple contentions normally before this can occur. For example, the UE has to first send scheduling request (SR) to the gNB, and once the request is received the gNB has to perform LBT before sending an UL grant, and finally once the user equipment (UE) has received the grant it has to perform LBT before accessing the channel. While this is a tedious procedure even when LBT does not need to be performed, LBT further increases latency and limits greatly the efficiency of the system especially if this procedure has to be repeated for every TTI transmission. In order to make this process more efficient, multiple-slots/TTIs can be scheduled at once, and in order to do so a proper design is needed. In this disclosure, the design of multi-slot/TTI scheduling is further envisioned and detailed.

In order to limit DCI overhead and increase the spectral efficiency for an NR system comprising network devices operating on unlicensed spectrum for which LBT procedure is utilized, multi-TTI scheduling can be supported for processing or generating NR unlicensed (NR-U) communications. As such, various embodiments/aspects for the design of multi-TTI scheduling for NR operating on unlicensed spectrum are disclosed for NR-U communications to be operable.

Additionally, because a transmission can be conditional to the success of the LBT procedure in a NR system operating on unlicensed spectrum, the NR scheduling procedure and the HARQ timing mechanism is not necessarily applicable. Motivated by this, further embodiments/aspects enhance the scheduling procedure and HARQ timing procedure of NR in order to allow an efficient way to operate in unlicensed spectrum.

Additional aspects and details of the disclosure further described below with reference to figures.

Embodiments described herein can be implemented into a system or network device using any suitably configured hardware and/or software. FIG. 1 illustrates an architecture of a system 100 of a network in accordance with some embodiments. The system 100 is illustrated to include a UE 101 and a UE 102, which can further represent new radio (NR) devices (e.g., a UE or gNB) or the like as discussed herein.

FIG. 1 illustrates an architecture of a system 100 of a network in accordance with some embodiments. The system 100 is shown to include a user equipment (UE) 101 and a UE 102. As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 101 and 102 are illustrated as smartphones (e.g., handheld touch-screen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections (or channels) 103 and 104, respectively, each of which comprises a physical communications interface or layer (discussed in further detail infra). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 105 may be used in vehicular applications and communications technologies, which are often referred to as V2X systems. V2X is a mode of communication where UEs (for example, UEs 101, 102) communicate with each other directly over the PC5/SL interface 105 and can take place when the UEs 101, 102 are served by RAN nodes 111, 112 or when one or more UEs are outside a coverage area of the RAN 110. V2X may be classified into four different types: vehicle-to-vehicle (V2V), vehicle-to-infrastructure (V2I), vehicle-to-network (V2N), and vehicle-to-pedestrian (V2P). These V2X applications can use "co-operative awareness" to provide more intelligent services for end-users. For example, vehicle UEs (vUEs) 101, 102, RAN nodes 111, 112, application servers 130, and pedestrian UEs 101, 102 may collect knowledge of their local environment (for example, information received from other vehicles or sensor equipment in proximity) to process and share that knowledge in order to provide more intelligent services, such as cooperative collision warning, autonomous driving, and the like. In these implementations, the UEs 101, 102 may be implemented/employed as Vehicle Embedded Communications Systems (VECS) or vUEs.

The UE 102 is shown to be configured to access an access point (AP) 106 (also referred to as "WLAN node 106", "WLAN 106", "WLAN Termination 106" or "WT 106" or the like) via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below). In various embodiments, the UE 102, RAN 110, and AP 106 may be configured to utilize LTE-WLAN aggregation (LWA) operation and/or WLAN LTE/WLAN Radio Level Integration with IPsec Tunnel (LWIP) operation. The LWA operation may involve the UE 102 in RRC_CONNECTED being configured by a RAN node 111, 112 to utilize radio resources of LTE and WLAN. LWIP operation may involve the UE 102 using WLAN radio resources (e.g., connection 107) via Internet Protocol Security (IPsec) protocol tunneling to authenticate and encrypt packets (e.g., internet protocol (IP) packets) sent over the connection 107. IPsec tunneling may include encapsulating entirety of original IP packets and adding a new packet header, thereby protecting the original header of the IP packets.

The RAN 110 can include one or more access nodes that enable the connections 103 and 104. As used herein, the terms "access node," "access point," or the like may describe equipment that provides the radio baseband functions for data and/or voice connectivity between a network and one or more users. These access nodes can be referred to as base stations (BS), NodeBs, evolved NodeBs (eNBs), next Generation NodeBs (gNB), RAN nodes, Road Side Units (RSUs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by a gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance with various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, 8, etc.).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 120 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
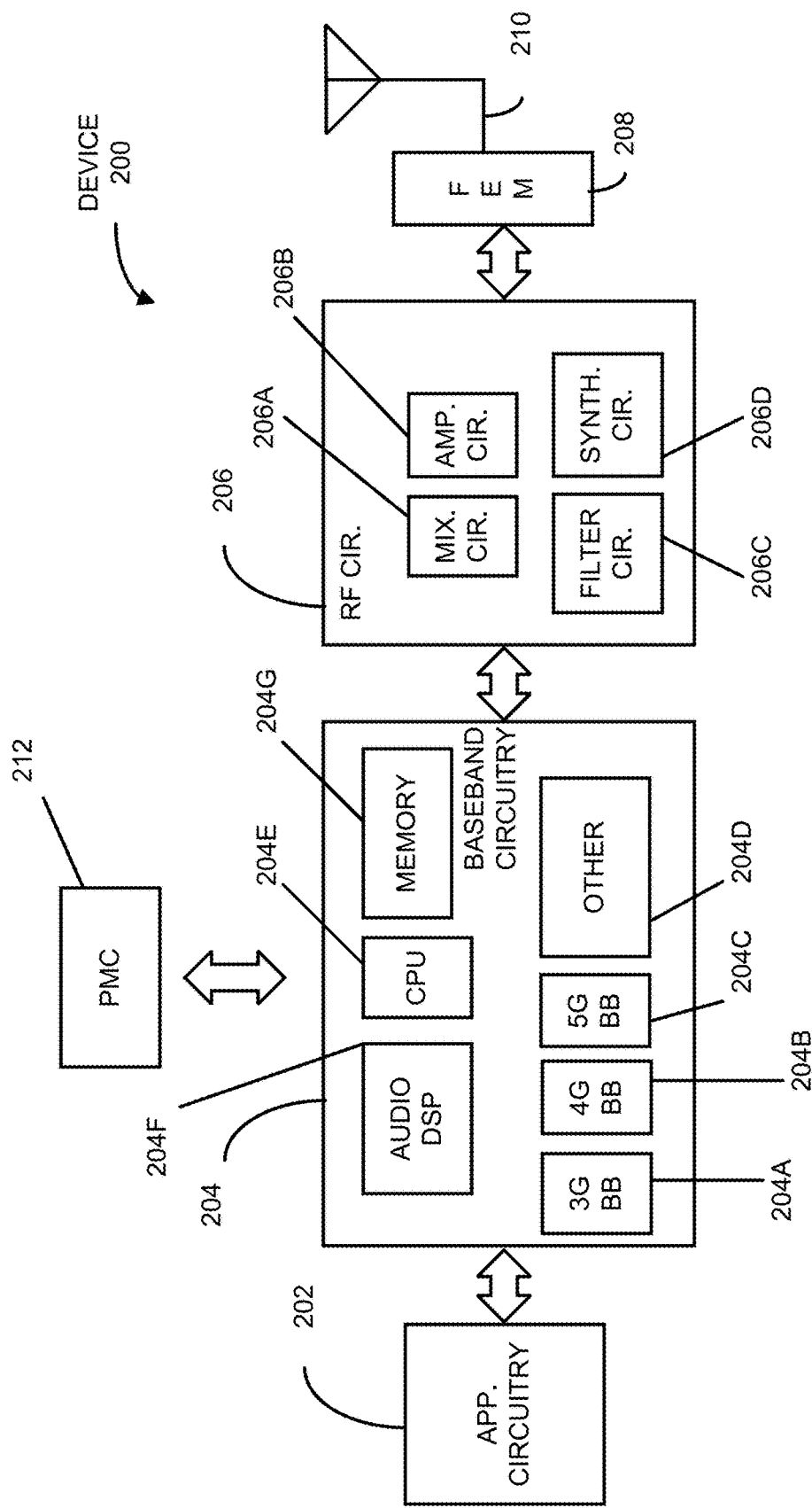
FIG. 2 is a diagram illustrating example components of a device that can be employed in accordance with various aspects discussed herein.

FIG. 2 illustrates example components of a device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node, such as UE 101/102, or eNB/gNB 111/112. In some embodiments, the device 200 can include less elements (e.g., a RAN node can not utilize application circuitry 202, and instead include a processor/controller to process IP data received from an EPC). In some embodiments, the device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuity 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tail-biting convolution, turbo, Viterbi, or Low Density Parity Check (LDPC)

encoder/decoder functionality. Embodiments of modulation/demodulation and encoder/decoder functionality are not limited to these examples and can include other suitable functionality in other embodiments.

Figure 4:
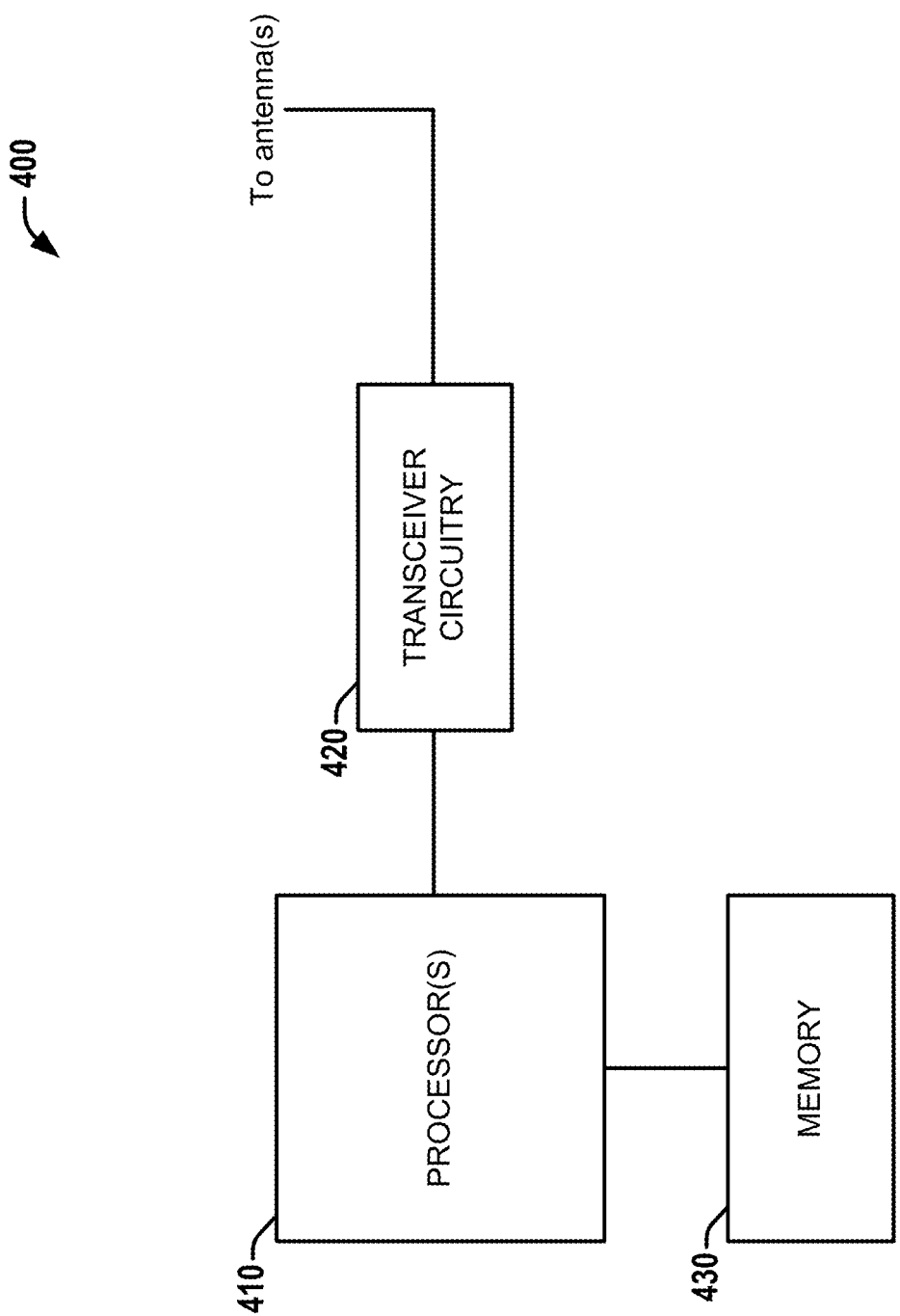
FIG. 4 is a block diagram illustrating a system employable at a UE, according to various aspects described herein.
Figure 5:
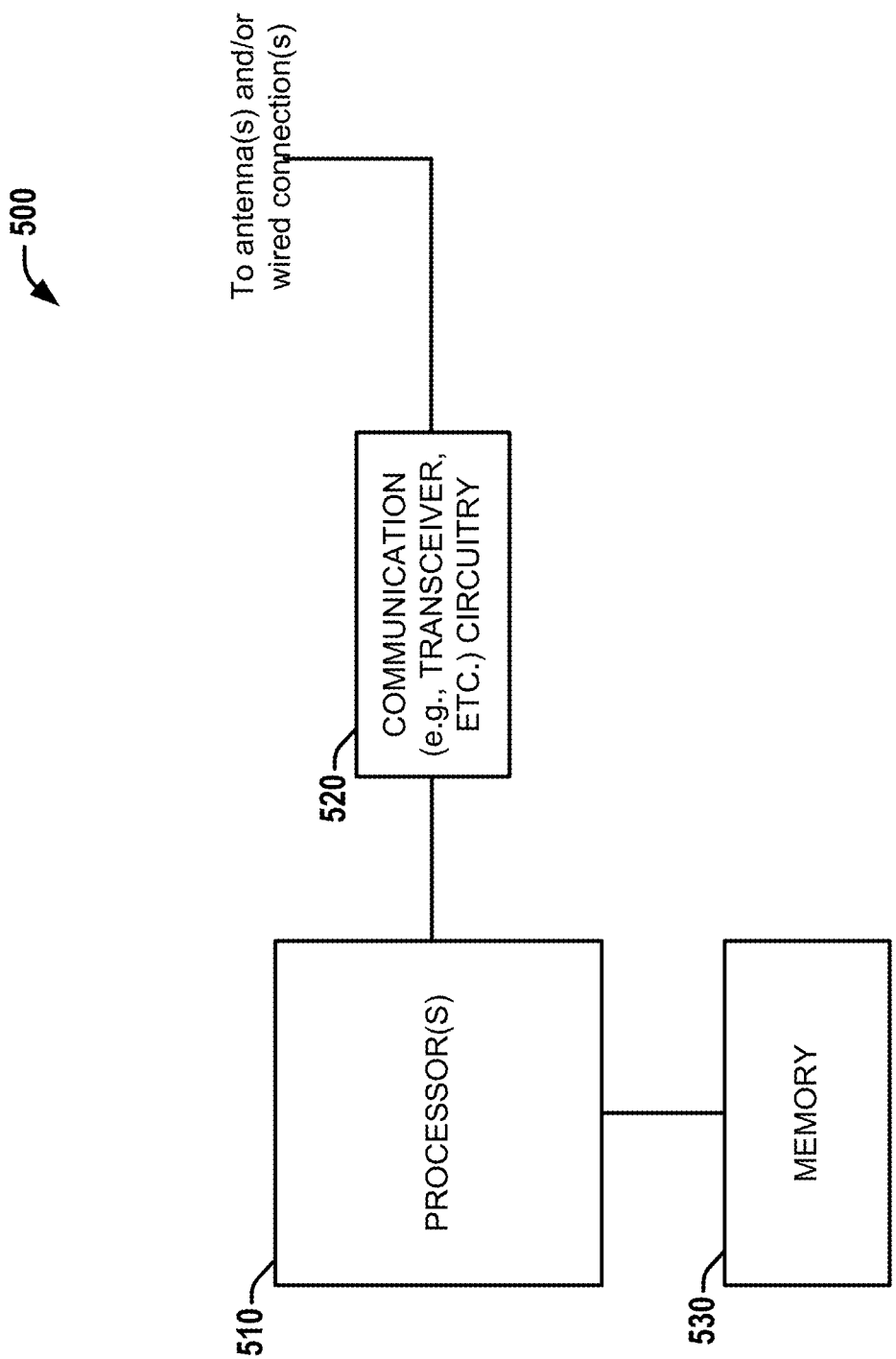
FIG. 5 is a block diagram illustrating a system employable at a Base Station (BS) according to various aspects described herein.

In addition, the memory 204G (as well as other memory components discussed herein, e.g., memory 430 of FIG. 4, memory 530 of FIG. 5 or the like) can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

In some embodiments, the baseband circuitry 204 can include one or more audio digital signal processor(s) (DSP) 204F. The audio DSP(s) 204F can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206*d* can be a fractional-N synthesizer or a fractional N/N+1 synthesizer, although the scope of the embodiments is not limited in this respect as other types of frequency synthesizers can be suitable. For example, synthesizer circuitry 206*d* can be a delta-sigma synthesizer, a frequency multiplier, or a synthesizer comprising a phase-locked loop with a frequency divider.

The synthesizer circuitry 206*d* can be configured to synthesize an output frequency for use by the mixer circuitry 206*a* of the RF circuitry 206 based on a frequency input and a divider control input. In some embodiments, the synthesizer circuitry 206*d* can be a fractional N/N+1 synthesizer.

In some embodiments, frequency input can be provided by a voltage-controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206*d* of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206*d* can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other embodiments, the PMC 212 can be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 can not receive data in this state, in order to receive data, it must transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used to execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
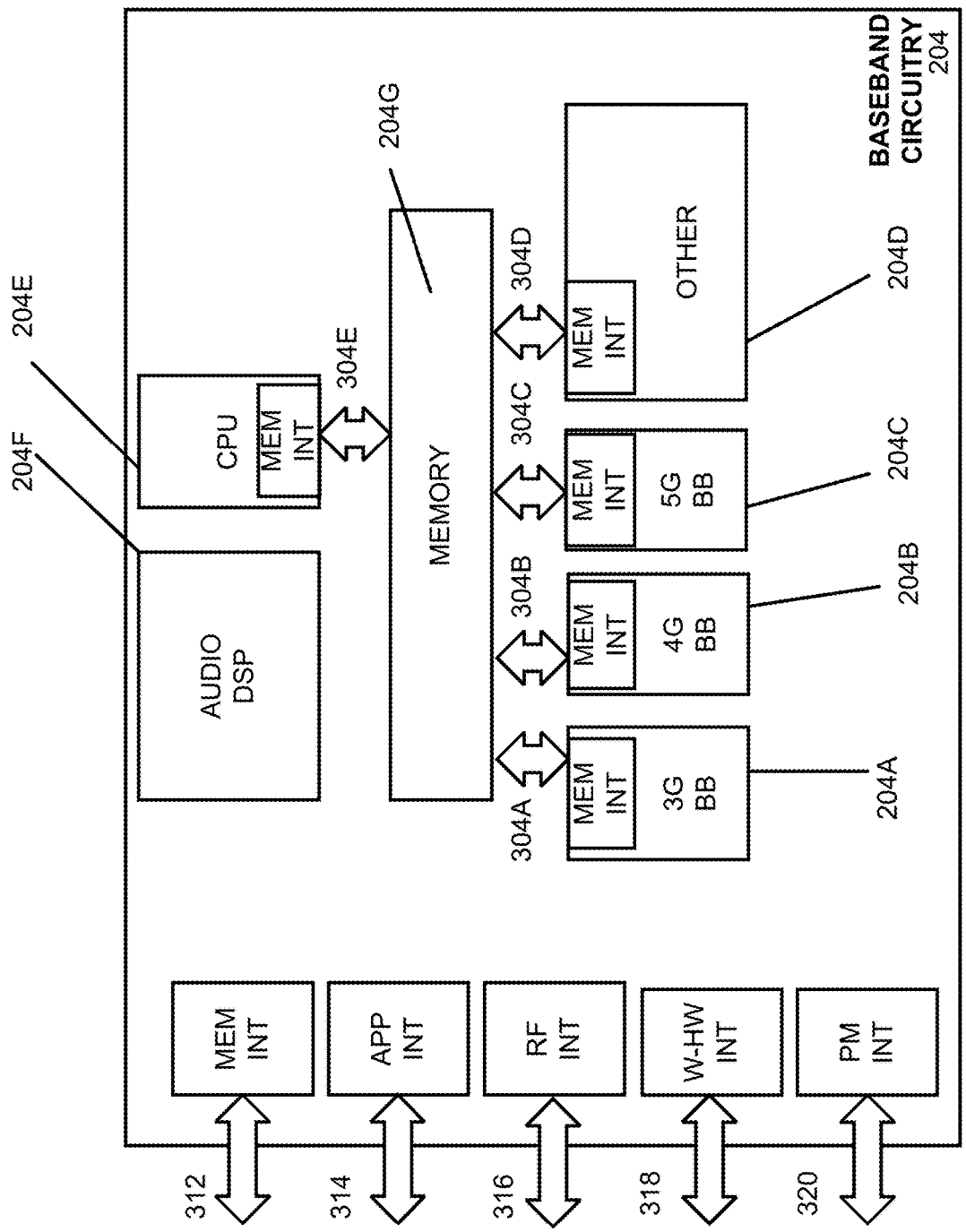
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Referring to FIG. 4, illustrated is a block diagram of a system/device 400 employable at a UE or other network device (e.g., UE 101/102) that facilitates DCI or other signaling configurations to reduce the decoding complexity and signaling overhead for 5G NR devices as UE 101/102, for example. System 400 can include one or more processors 410 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), transceiver circuitry 420 (e.g., comprising part or all of RF circuitry 206, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 430 (which can comprise any of a variety of storage mediums and can store instructions and/or data associated with one or more of processor(s) 410 or transceiver circuitry 420).

Referring to FIG. 5, illustrated is a block diagram of a system 500 employable at a Base Station (BS), eNB, gNB or other network device (e.g., aV2X node as eNB/gNB 111/112) that can enable generation and processing of configurable search spaces and related resources (e.g., times, time instances, CCEs, aggregation levels, or the like) for one or more UEs (e.g., URLLC UEs, or non-URLLC UEs) according to various aspects described herein. System 500 can include one or more processors 510 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), communication circuitry 520 (e.g., which can comprise circuitry for one or more wired (e.g., X2, etc.) connections and/or part or all of RF circuitry 206, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 530 (which can comprise any of a variety of storage mediums and can store instructions and/or data associated with one or more of processor(s) 510 or communication circuitry 520). In various aspects, system 500 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 510, communication circuitry 520, and the memory 530 can be included in a single device, while in other aspects, they can be included in different devices, such as part of a distributed architecture.

In order to limit DCI overhead and increase the spectral efficiency for an NR system comprising the UE 101/102/410, or the gNB 111/112/510 or other network device/component operating on unlicensed spectrum for which LBT is utilized, multi-TTI scheduling can be supported for processing or generating NR unlicensed (NR-U) communications. As such, various embodiments/aspects for the design of multi-TTI scheduling for NR operating on unlicensed spectrum are disclosed for NR-U communications to be operable and provide HARQ feedback, for example.

Additionally, because a transmission can be conditional to the success of the LBT procedure in a NR system operating on unlicensed spectrum, the NR scheduling procedure and the HARQ timing mechanism is not necessarily applicable. Motivated by this, further embodiments/aspects enhance the scheduling procedure and HARQ timing procedure of NR in order to allow an efficient way to operate in unlicensed spectrum.

As such, the UE 101/102/410, or the gNB 111/112/510 or other network device can generate or process a flexible timing multi-subframe/slot/transmission time interval (TTI) scheduling. A timing offset can be counted from subframe N+4+k, where "k" is signaled from [0, . . . , 15], for example, or other subframe/slot/TTI. In that occasion DCI formats 0B/4B enable scheduling a maximum of $N_{sf}$ consecutive subframes (slots or TTIs), where $N_{sf}$ (2~4), a subframe/slot number or TTI number can be configurable by UE-specific RRC. The number of scheduled subframes can be indicated in a bit(s) field (e.g., a ½ bit(s) field, or the otherwise) called "number of scheduled subframes" in the DCI format 0B/4B, for example. In this case, a HARQ process ID can be indicated for one subframe/slot/TTI and the identifiers (IDs) for the other subframes/slots/TTIs can be consecutively derived, and a 1-bit RV (0 or 2) value is indicated per scheduled subframe/slot/TTI.

In one embodiment, in order to enable this efficient scheduling procedure in NR, a new DCI format can be introduced, or format 1_0/1_1 can be re-interpreted. In an aspect, multi-subframe scheduling can be supported, and the number of consecutive subframes can be dynamically configured through DCI or configured through UE-specific RRC signalling. In one embodiment, the same frequency domain resource allocation (RA) can be applied to all the multi-subframe scheduling. Alternatively, or additionally, the same time domain RA (starting and ending symbols) can be applied to multi-subframe scheduling. In one embodiment, the PDCCH can indicate through a pair of values (i.e, UL burst duration, and offset) the UL burst starting position and duration such that it is possible to skip monitoring. As such, if a HARQ feedback (e.g., HARQ acknowledgement/negative acknowledgement (HACK ACK/NACK) feedback) is processed beyond or not within the defined duration, then this HARQ feedback could be skipped or not monitored, thereby freeing resources for other HARQ feedback processing at the gNB, for example.

Other embodiments in addition to multi-subframe/slot/TTI scheduling mechanisms, include HARQ timing procedures. In order to ensure, flexible timing scheduling between the subframe/slot/TTI carrying the UL grant and those of the corresponding PUSCH, the NR scheduling procedure can be reused with some modications, which relies on K0 (which provides the DL assignment and corresponding DL data transmssion), K1 (which indicates the DL data reception and corresponding HARQ-ACK feedback), and K2 (which indicates the UL assignment and corresponding UL data transmission), as illustrated in FIG. 6 with NR schedulign and HARQ timing procedures 600.

Figure 6:
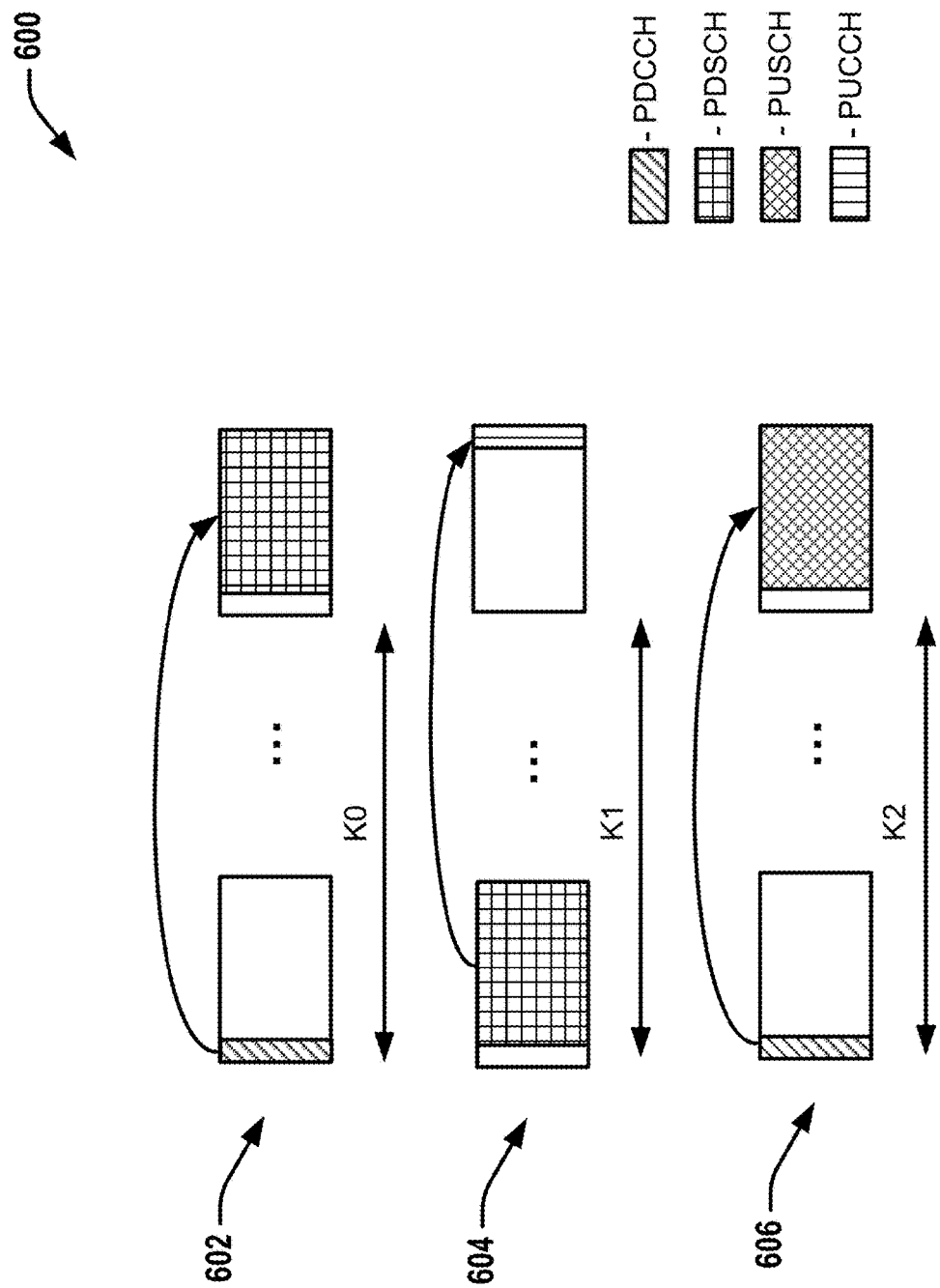
FIG. 6 is a diagram illustrating an example of new radio (NR) scheduling, and Hybrid Automatic Repeat Request (HARQ) timing procedure, in connection with various aspects discussed herein.

As illustrated at FIG. 6, the K0 602 provides the downlink DL assignment and corresponding DL data transmssion. The K0 602 can thus be a value or other indication that provides timing when the gNB 111/112/510 schedules the DL transmission and a corresponding start in the PDSCH. The DCI of the PDCCH can schedule where the PDCCH is performed after K0 symbols, for example.

The K1 604 indicates a value or indication of related timing between the DL data reception on PDSCH and corresponding HARQ-ACK feedback to be generated on the pysical uplink control channel (PUCCH).

The K2 606 indicates a value or indication of when the gNB 111/112/510 assigns an UL transmission and the UE 101/102/410 performs a data transmission. Thus, the K2 606 defines the UL assignment and corresponding UL data transmission.

In one embodiment, the value of K1 can be dynamically indicated in a new DCI defined (e.g., via gNB 111/112/510, predefined or other network component) for multi-subframe/-slot/-TTI scheduling, or it can be signalled by a higher layer such as by being RRC signalled. In an aspect, the indication of K1 can be semi-static or semi-persistent, and further comprise a bit field in the DCI, meaning that the timing relationship can be fixed, or have a dynamic bit field (e.g., a non-zero bit field) in the DCI giving a dynamic indication that varies among NR-U transmissions depending on one or more criteria (e.g., feedback, duration, capability, processing time, contention complexity, or the like).

The processing time, N2, as it can be referred to can be in terms of OFDM symbols, for example, and be a defined time for the UE 101/102/410 to decode the PDCCH, which has an indication of where the UE 101/102/410 should transmit the HARQ process ID; it is a minimum amount of time for UE decoding. The gNB 111/112/510 can then configured to receive this HARQ process ID or HARQ ID at no point earlier than this N2 processing time. Further, the gNB 111/112/510 can determine whether the HARQ feedback satisfies a processing time, and in response to the HARQ feedback not satisfying the processing time, monitoring of the particular HARQ feedback can be skipped to free up resources or process other HARQ feedbacks.

In one embodiment, as the feedback timing cannot be guaranteed or is not necessarily successful due to LBT, or as an unsuccessful LBT result, the UE 101/102/410 can transmit any or all pending HARQ ACK feedbacks in an earliest UL opportunity (e.g., transmit opportunity). In one embodiment, because there is not necessarily a deterministic timing relationship between a DL transmission and the time, when the corresponding HARQ-ACK information is transmitted, the HARQ-ACK feedback of all HARQ processes can be transmitted in a bitmap, for example, using an implicit association between the index in the bitmap and a HARQ process ID.

In another embodiment, the HARQ-ACK multiplexing for multiple PDSCHs of one or more carriers can further be supported. In one embodiment, from the UE 101/102/410 perspective, HARQ ACK/NACK feedback for multiple DL transmissions in time can be transmitted in one UL data/control region. In one embodiment, all the pending HARQ-ACK feedbacks meeting the N2 processing time (which is the number of orthogonal frequency-division multiplexing (OFDM) symbols required for UE processing from the end of the NR-PDCCH containing the UL grant to the earliest possible start of the corresponding NR-PUSCH transmission from UE perspective) can be transmitted in the earliest UL opportunity including PUSCH/PUCCH. In one embodiment, K1 can be either indicated in the DCI or not. If not indicated (or indicated with null information), the UE can transmit HARQ-ACK feedback autonomously in the earliest UL opportunity. In one embodiment, as an alternative or additionally, a bitmap based HARQ codebook can be adopted or configured, where there is an association between HARQ process ID and the bit position in the bitmap.

In one embodiment, the bitmap size can be reduced via bundling over processes. These processes can include a HARQ ID process where transmission can be performed per transport block or per code block group (CBG). The HARQ or HARQ feedback for each CBG can be bundled together instead of utilizing a bit or bits per HARQ process ID. This can thus reduce the size of bits per bitmap (e.g., 16 total, depending on the transmission layers, carrier used, and CBG configured per transport block (TB)).

In one embodiment, instead of defining a fixed occasion to transmit the HARQ ACK/NACK feedback, a window within which the feedback is expected can be configured/defined that has the length of max_K1−min_K1 value (a max K1 value minus a minimum K1 value, as configured). In one embodiment, the values of these two parameters can be semi-statically configured through RRC signaling or DCI indication, or they can be fixed. In one embodiment, the indication of the length of the window, can be provided through a bitmap, which can have a symbol-level or a slot-level granularity. In one embodiment, multiple PUCCH occasions in time domain can be allowed and are configurable: indication of the repetition level can be indicated in the DCI.

In one embodiment, type-2 HARQ-ACK codebook can further be supported. In this case, in one embodiment, a new DCI can be defined in order to trigger the HARQ ACK feedback, which indicates the HARQ ID. In one embodiment, as an alternative, the UE 101/102/410 can autonomously send out any or all the pending HARQ ACK in the earliest UL (either PUCCH/PUSCH) using a bitmap. In one embodiment, K1 is not indicated within the scheduling DCI.

Referring to FIG. 7, illustrated is an example of multiple slot or TTI transmissions 700 being scheduled with different configurations 702 and 704. For example, a set of multi-TTI scheduling can be scheduled with only one dedicated DCI (710) and the scheduled TTI have the restriction to be consecutive thereafter. A physical representation is provided in FIG. 7 at the continuous transmission 702. In one embodiment, the DCI 710 for multi-subframe/slot/TTI scheduling can contain a field that indicates the number of consecutive scheduled TTIs or slots (e.g., 716, 717). The DCI 710 in a PDCXCH that schedules PUCCH transmission 714 as continuous within an maximum channel occupancy time (MCOT).

In one embodiment, the DCI for multi-TTI scheduling can contain a bitmap indication, which provides indication of which TTIs are scheduled. In this case, the TTIs do not necessarily need to be consecutive, and while offering a higher flexibility this can come at the cost of an increased overhead in terms of signaling.

Another configuration representation 704 of an aggregated transmission includes a gap 722 between each aggregate 724 and 726 as illustrated. In this embodiment, a gap 722 is introduced between PUSCH transmissions 728 and 730, with the PDCCH 720 and PDCCH in the gap 722. Indicated in the rectangles are the OFDM symbols used for PDCCH 720, 722, and PUSCH 728 and 730, which is continuous within each aggregate of a slot or TTI, but not therebetween. In one embodiment, each TTI may be configured separately by a specific DCI 720 and 722. In one embodiment, a DCI may contain indications for a group of TTIs within a slot or a set of consecutive slots.

In one embodiment, the PDCCH or group based PDDCH (GC-PDCCH) 720, 720 or 722 indicates how the TTIs are composed (i.e., number of symbols), and how the slots of the burst 702 or 704 are composed by TTIs (i.e., number of TTIs and composition of each TTI including their time domain length). As an example, the first slot (e.g., 716 or 724) of a burst could be consisting of 2 symbol TTI+12 symbol TTI, or 2 symbol TTI+2 symbol TTI+10 symbol TTI. As such, the TTIs can have a different length or have the same length (e.g., the length of a slot, less or more than a slot). In one embodiment, the following slots in the burst could be consisting of a single TTI or have the same structure as the first slot, or a different composition which is indicated in the GC-PDCCH.

In one embodiment, a transport block mapping does not span over slot boundary and is contained within a slot. In one embodiment, the TTIs may be consecutive or non-contiguous, and in the latter option a bitmap indication may be introduced and carried in the DCI for multi-TTI scheduling.

Referring to FIG. 8, illustrated are examples of different fields that can be used or not when configuring the scheduling via the DCI of a PDCCH in accord with various embodiments/aspects being described herein.

Designs for scheduling PUSCH transmission can include NR formats, such as NR, format 0_0 and 0_1 are introduced for PUSCH scheduling, and their structure is summarized in the Table 800.

When one or more network devices of NR systems disclosed herein configure/generate/process the DCI format(s) for multi-slot/TTI scheduling one or more conditions/embodiments/aspects can be applied. 1) The DCI design can be made efficient by avoiding duplicated signalling for information that can be commonly apply to multiple scheduled TTIs/slots/subframes; such information includes a carrier indictor field (CIF), a bandwidth part (BWP) indicator, a frequency/time resource allocation (RA), a modulation coding scheme (MCS), a virtual resource block (VRB) to physical resource block (PRB) mapping, a frequency hopping flag, a multiple input and multiple output (MIMO) parameters that are related such as precoding information and a number of layers, and antenna ports. Some of this information would not be needed necessarily to be signalled if resource allocation type 1 is not used for NR-unlicensed communications. As another parameter, a code block group (CBG) transmission information can be signalled once and assumed to be equally applied to multiple TTIs. 2) There are also parameters that could be applied only once over consecutively scheduled slots and, thus, no need to be signalled multiple times including a transmit power control (TPC), a sounding reference signal (SRS) request, a channel state information (CSI) request, or a demodulation reference signal (DMRS) sequence initialization to indicate one or more parameters related to the plurality of TTIs within a transmission opportunity for the NR-U communication. 3) There are also parameters that can be signalled only for the first TTI and the parameters for the following TTIs can be derived according to a pre-defined rule. For example, the HARQ process ID for the first TTI can be signalled and the HARQ process ID for the following TTIs can be chosen in a successive manner. 4) Some related information could be separately signalled for multiple TTIs such as a new data indicator NDI, and redundancy version RV. 5) Some other information could be revisited if needed for unlicensed use case such as UL/SUL indicator. 6) Some additional information need to be carried compared to what is contained in format 0_0 and 0_1: for instance the LBT related parameters such as type and priority class may be additionally carried. UL starting and ending position might also be carried as well as indication of MCOT sharing.

In one embodiment, there can be a maximum of N DCI formats including combinations of different formats that a UE is configured to monitor at a given monitoring occasion, wherein N can be an integer of one or greater.

In one embodiment, one or two new DCI formats are introduced for Multi-TTI Scheduling for NR operating on unlicensed spectrum. In one embodiment, the new formats can have the same payload as DCI format 0_0 and/or 0_1, or the payload might be higher. In the first case, the fields of format 0_0 and format 0_1 can be reinterpreted to determine the configurations of multi-subframe/slot/scheduling as well as one or more embodiments described herein.

Figure 9:
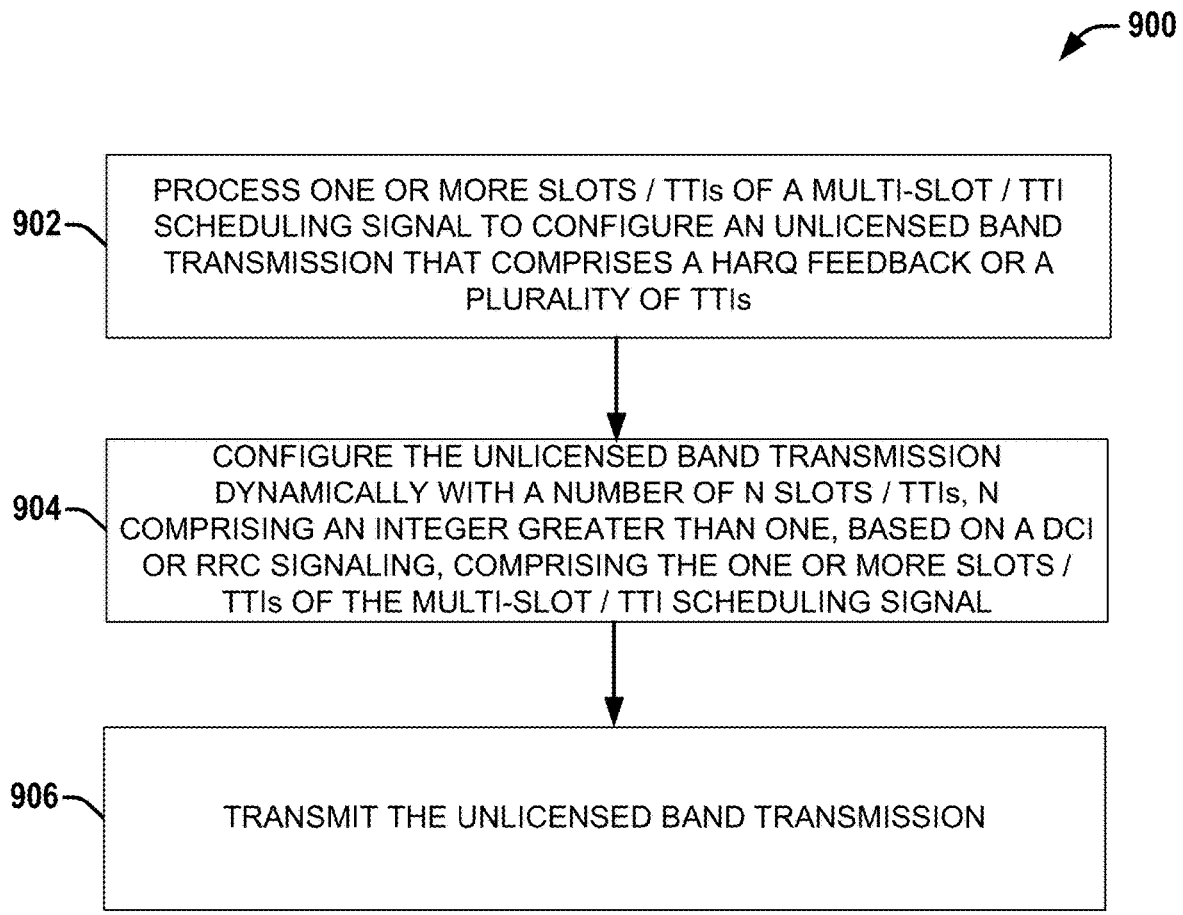
FIG. 9 is a diagram illustrating an example process flow for configuring multi-subframe/slot/TTI transmissions and HARQ timing processes according to various aspects discussed herein.

Referring to FIG. 9, illustrated an example process flow 900 for a network device (e.g., a user equipment (UE), or a new radio NB (gNB)) can process or generate a configuration of a multi-subframe scheduling signal to configure an unlicensed band transmission that comprises an hybrid automatic repeat request (HARQ) feedback or a plurality of time transmission intervals (TTIs).

The process flow 90 can initiate at 902 with processing one or more slots/time transmission intervals (TTIs) of a multi-slot/TTI scheduling signal to configure an unlicensed band transmission that comprises an hybrid automatic repeat request (HARQ) feedback or a plurality of TTIs.

AT 904, the process flow 900 further comprises configuring the unlicensed band transmission dynamically with a number of N slots/TTIs, N comprising an integer greater than one, based on a downlink control information (DCI) or a radio resource control (RRC) signaling, comprising the one or more slots/TTIs of the multi-slot/TTI scheduling signal.

At 906, the process flow 900 further comprises transmitting the unlicensed band transmission.

Further, a UE can process or the gNB can generate an indication from the one or more slots/TTIs that indicates the number of N slots/TTIs, wherein the one or more slots/TTIs comprises a one or two bit field comprising the indication, and a HARQ process identifier (ID) corresponding to a subframe from which subsequent HARQ IDs for other slots/TTIs are derived to configure the unlicensed band transmission with the HARQ feedback on a plurality of slots/TTIs or the plurality of TTIs.

Figure 10:
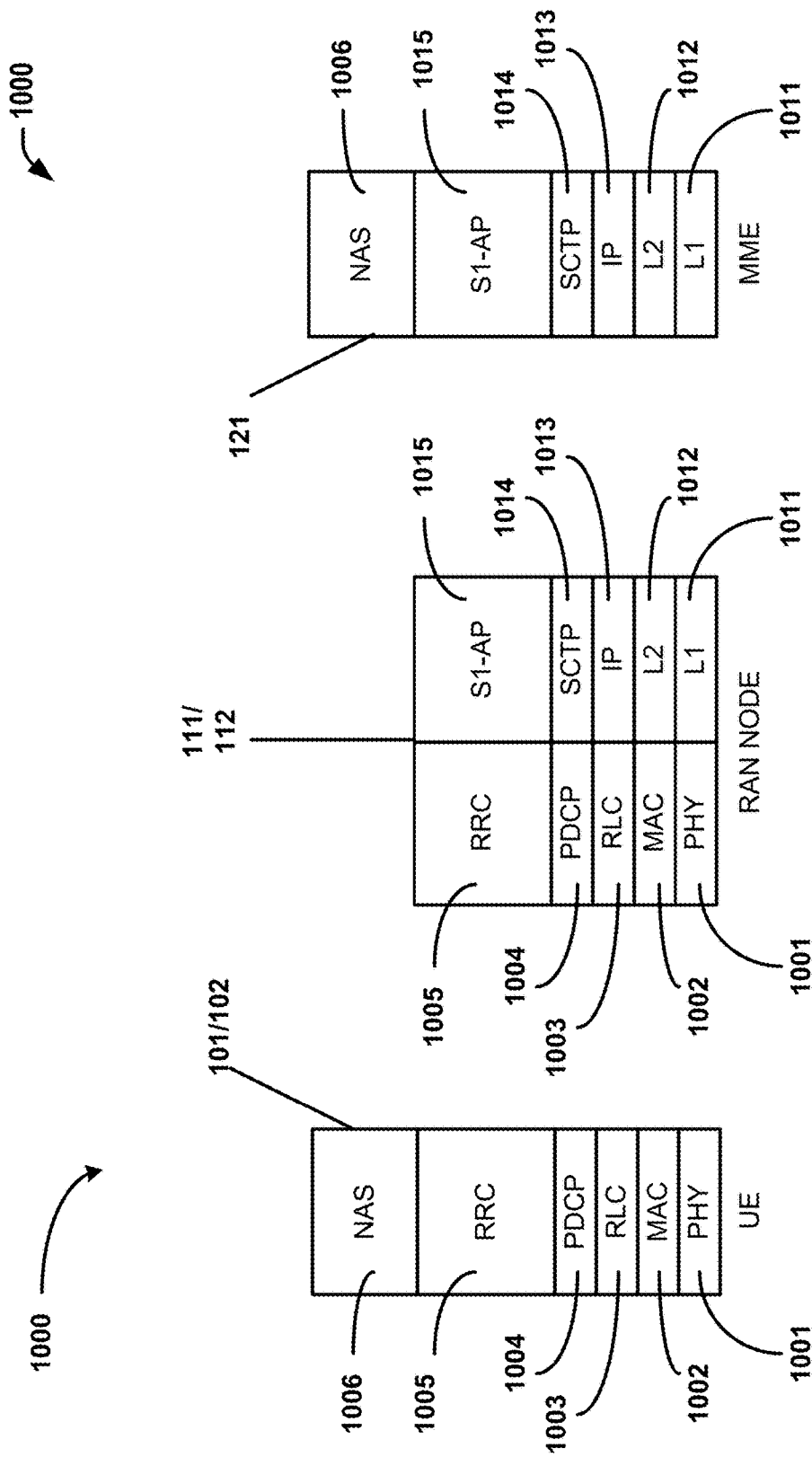
FIG. 10 illustrates a control plane protocol stack that can be implemented for operation of various embodiments and aspects described herein.

FIG. 10 is an illustration of a control plane protocol stack in accordance with various embodiments described herein. In this embodiment, a control plane 1000 is shown as a communications protocol stack between the UE 101 (or alternatively, the UE 102), the RAN node 111 (or alternatively, the RAN node 102), and the MME 121.

The PHY layer 1001 may transmit or receive information used by the MAC layer 1002 over one or more air interfaces. The PHY layer 1001 may further perform link adaptation or adaptive modulation and coding (AMC), power control, cell search (e.g., for initial synchronization and handover purposes), and other measurements used by higher layers, such as the RRC layer 1005. The PHY layer 1001 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1002 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 1003 may operate in a plurality of modes of operation, including: Transparent Mode (TM), Unacknowledged Mode (UM), and Acknowledged Mode (AM). The RLC layer 1003 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1003 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1004 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1005 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 101 may utilize a Uu interface (e.g., an LTE-Uu interface) to exchange control plane data via a protocol stack comprising the PHY layer 1001, the MAC layer 1002, the RLC layer 1003, the PDCP layer 1004, and the RRC layer 1005.

The non-access stratum (NAS) protocols 1006 form the highest stratum of the control plane between the UE 101 and the MME 121. The NAS protocols 1006 support the mobility of the UE 101 and the session management procedures to establish and maintain IP connectivity between the UE 101 and the P-GW 123.

The S1 Application Protocol (S1-AP) layer 1015 may support the functions of the S1 interface and comprise Elementary Procedures (EPs). An EP is a unit of interaction between the RAN node 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1014 may ensure reliable delivery of signaling messages between the RAN node 111 and the MME 121 based, in part, on the IP protocol, supported by the IP layer 1013. The L2 layer 1012 and the L1 layer 1011 may refer to communication links (e.g., wired or wireless) used by the RAN node and the MME to exchange information.

The RAN node 101 and the MME 121 may utilize an S1-MME interface to exchange control plane data via a protocol stack comprising the L1 layer 1011, the L2 layer 1012, the IP layer 1013, the SCTP layer 1014, and the S1-AP layer 1015.

Figure 11:
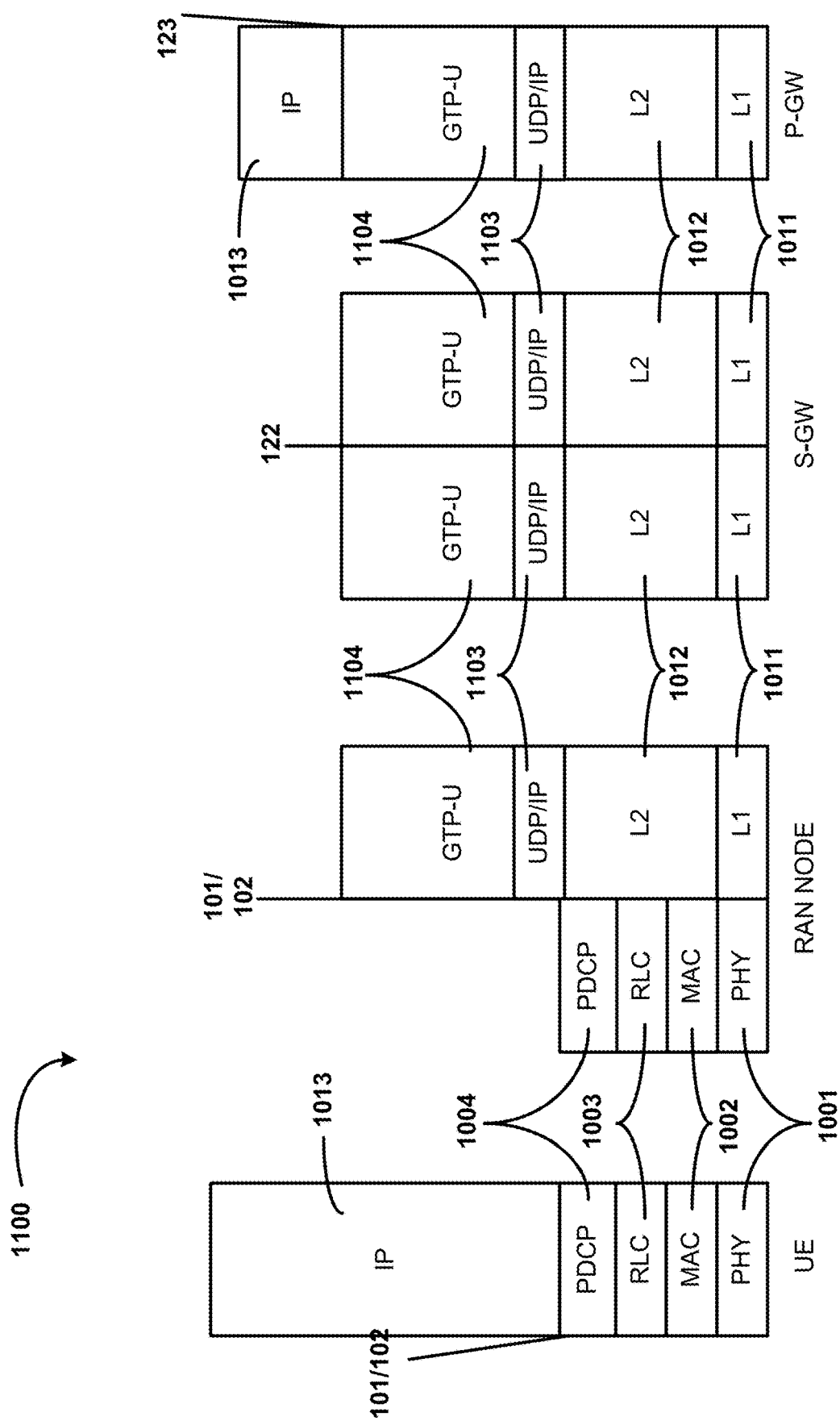
FIG. 11 illustrates user plane protocol stack that can be implemented for operation of various embodiments and aspects described herein.

FIG. 11 is an illustration of a user plane protocol stack in accordance with one or more embodiments herein. In this embodiment, a user plane 1100 is shown as a communications protocol stack between the UE 101 (or alternatively, the UE 102), the RAN node 111 (or alternatively, the RAN node 112), the S-GW 122, and the P-GW 123. The user plane 1000 may utilize at least some of the same protocol layers as the control plane 1000. For example, the UE 101 and the RAN node 101 may utilize a Uu interface (e.g., an LTE-Uu interface) to exchange user plane data via a protocol stack comprising the PHY layer 1001, the MAC layer 1002, the RLC layer 1003, the PDCP layer 1004.

The General Packet Radio Service (GPRS) Tunneling Protocol for the user plane (GTP-U) layer 1104 may be used for carrying user data within the GPRS core network and between the radio access network and the core network. The user data transported can be packets in any of IPv4, IPv6, or PPP formats, for example. The UDP and IP security (UDP/IP) layer 1103 may provide checksums for data integrity, port numbers for addressing different functions at the source and destination, and encryption and authentication on the selected data flows. The RAN node 101 and the S-GW 122 may utilize an S1-U interface to exchange user plane data via a protocol stack comprising the L1 layer 1011, the L2 layer 1012, the UDP/IP layer 1103, and the GTP-U layer 1104. The S-GW 122 and the P-GW 123 may utilize an S5/S8a interface to exchange user plane data via a protocol stack comprising the L1 layer 1011, the L2 layer 1012, the UDP/IP layer 1103, and the GTP-U layer 1104. As discussed above, NAS protocols support the mobility of the UE 101 and the session management procedures to establish and maintain IP connectivity between the UE 101 and the P-GW 123.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

Example 1 is an apparatus configured to be employed in a User Equipment (UE) for a new radio (NR) unlicensed (NR-U) communication comprising: one or more processors configured to: process one or more slots/time transmission intervals (TTIs) of a multi-slot/TTI scheduling signal to configure an unlicensed band transmission that comprises an hybrid automatic repeat request (HARQ) feedback or a plurality of TTIs; and configure the unlicensed band transmission dynamically with a number of N slots/TTIs, N comprising an integer greater than one, based on a downlink control information (DCI) or a radio resource control (RRC) signaling comprising the one or more slots/TTIs of the multi-slot/TTI scheduling signal; a radio frequency (RF) interface, configured to provide, to RF circuitry, data for processing the multi-slot/TTI scheduling signal or transmitting the unlicensed band transmission.

Example 2 includes the subject matter of Example 1, wherein the one or more processors are further configured to: process an indication from the one or more slots/TTIs that indicates the number of N slots/TTIs, wherein the one or more slots/TTIs comprises a bit field comprising the indication, and a HARQ process identifier (ID) corresponding to a subframe from which subsequent HARQ IDs for other slots/TTIs are derived to configure the unlicensed band transmission with the HARQ feedback on a plurality of slots/TTIs.

Example 3 includes the subject matter of any one or more of Examples 1-2, wherein the one or more processors are further configured to: process a K1 indication from the one or more slots/TTIs comprising a K1 value in the DCI or RRC signaling or predefined, wherein the K1 value is semi-statically scheduled or dynamically indicated based on a state of a bit field, and the K1 value indicates a timing related to a downlink data reception and the corresponding HARQ feedback.

Example 4 includes the subject matter of any one or more of Examples 1-3, wherein the one or more processors are further configured to: process a HARQ-acknowledgement/negative acknowledgement (HARQ-ACK) multiplexed on physical downlink shared channels (PDSCHs) of one or more carriers, wherein the HARQ feedback corresponds to a plurality of DL transmissions in one UL data/control region.

Example 5 includes the subject matter of any one or more of Examples 1-4 wherein the one or more processors are further configured to: generate a bitmap comprising the HARQ feedback and an implicit association between an index and a HARQ process ID to enable a determination of which physical downlink shared channel (PDSCH) the HARQ feedback is associated with.

Example 6 includes the subject matter of any one or more of Examples 1-5, wherein the one or more processors are further configured to: transmit the HARQ feedback that satisfies a processing time at an earliest UL opportunity from among UL opportunities, wherein the processing time comprises a time for processing OFDM symbols from an end of an NR-PDCCH with a UL grant to a start of NR-PUSCH.

Example 7 includes the subject matter of any one or more of Examples 1-6, wherein the one or more processors are further configured to: configure a window providing multiple opportunities for the HARQ feedback to be transmitted based on one or more parameters comprising: a maximum K1 value or a minimum K1 value, wherein a K1 value indicates a timing related to a downlink data reception and the corresponding HARQ feedback, wherein the parameters are received via the RRC signaling, the DCI or predefined, or by an indication of a window length from a bitmap based on a symbol-level or a slot level granularity.

Example 8 includes the subject matter of any one or more of Examples 1-7, wherein the plurality of TTIs vary from among one another based on one or more of: a length, a duration, or a number of symbols among one, or from among slots or TTIs based on composition of symbols or number of TTIs.

Example 9 includes the subject matter of any one or more of Examples 1-8, wherein the one or more processors are further configured to: process the DCI comprising a multi-TTI scheduling indication as a bitmap indication that indicates TTIs being scheduled for multi-TTI scheduling in a consecutive order or a non-contiguous order.

Example 10 includes the subject matter of any one or more of Examples 1-9, wherein the one or more processors are further configured to: configure the unlicensed band transmission dynamically with the number of N slots/TTIs by configuring the plurality of TTIs based on a continuous transmission of a physical uplink shared channel (PUSCH) across continuous symbols of a plurality of slots, or based on a gap within the plurality of slots that divides aggregated transmissions of the PUSCH.

Example 11 includes the subject matter of any one or more of Examples 1-10, wherein the one or more processors are further configured to: configure a first TTI based on a first DCI, and a second TTI differently from the first TTI based on a second DCI that is different from the first DCI, and determining parameters of a configuration for the first TTI or the second TTI based on a predetermined rule, or a reinterpretation of one or more fields or another field for indicating one or more parameters related to a number, a length, a duration, a symbol number or a grouping of TTIs for the one or more slots/TTIs.

Example 12 is an apparatus configured to be employed in a next generation NodeB (gNB) for a new radio (NR) unlicensed (NR-U) communication comprising: one or more processors configured to: assign one or more uplink transmissions; configure a multi-slot/TTI scheduling signal that enables a plurality of slots/TTIs to be configured in an unlicensed band of the one or more uplink transmissions including a hybrid automatic repeat request (HARQ) feedback or a plurality of time transmission intervals (TTIs); generate a data control information (DCI) with the multi-slot/TTI scheduling for transmission of the NR-U communication in a physical channel; a radio frequency (RF) interface, configured to provide, to RF circuitry, data for processing the multi-slot/TTI scheduling signal in the NR-U communication.

Example 13 includes the subject matter of Example 12, wherein the one or more processors are further configured to: process a hybrid automatic repeat request (HARQ) feedback comprising a plurality of HARQ processes in a bitmap comprising an index to one or more HARQ process IDs; and determine which physical downlink shared channel (PDSCH) is associated with the HARQ feedback based on an implicit association of a bit of an index to a HARQ process identifier (ID).

Example 14 includes the subject matter of any one or more of Examples 12-13, wherein the one or more processors are further configured to: generate a multiplex HARQ-acknowledgement/negative acknowledgement (HARQ-ACK/NACK) signal that is multiplexed based on a plurality of physical downlink shared channels (PDSCHs) of one or more carriers; and provide a plurality of DL transmissions in one UL data/control region to enable a HARQ feedback based on the one UL data/control region.

Example 15 includes the subject matter of any one or more of Examples 12-14, wherein the one or more processors are further configured to: determine whether the HARQ feedback satisfies a processing time; in response to the HARQ feedback not satisfying the processing time, skip monitoring of the HARQ feedback.

Example 16 includes the subject matter of any one or more of Examples 12-15, wherein the one or more processors are further configured to: indicate one or more parameters of a window that is variable or fixed to enable HARQ ACK/NACK feedback in response to a successful Listen Before Talk (LBT) operation, the one or more parameters of the window comprising at least one of: a start, an end, a length, a duration, a maximum value, or a minimum value that enables the window to include multiple opportunities for the HARQ ACK/NACK feedback to be transmitted on the NR-U transmission.

Example 17 includes the subject matter of any one or more of Examples 12-16, wherein the one or more processors are further configured to: generate the DCI with an indication that corresponds to one or more different TTIs within a slot or a plurality of slots that are consecutive to one another, wherein the indication indicates one or more parameters related to a number, a length, a duration, a symbol number or a grouping of TTIs for one or more slots, and wherein the DCI is generated in a physical downlink control channel (PDCCH) that schedules a physical uplink shared channel (PUSCH) transmission continuously across a plurality of slots of a maximum channel occupancy time (MCOT) or where each slot of the plurality of slots corresponds to a different PDCCH at a beginning of the slot.

Example 18 includes the subject matter of any one or more of Examples 12-17, wherein the one or more processors are further configured to: configure one or more fields of the DCI comprising one or more of: a carrier indictor field (CIF), a bandwidth part (BWP) indicator, a frequency/time resource allocation (RA), a modulation coding scheme (MCS), a virtual resource block (VRB) to physical resource block (PRB) mapping, a frequency hopping flag, a multiple input and multiple output (MIMO) parameter, antenna port field, a code block group (CBG) transmission information, a transmit power control (TPC), a sounding reference signal (SRS) request, a channel state information (CSI) request, or a demodulation reference signal (DMRS) sequence initialization to indicate one or more parameters related to the plurality of TTIs within a transmission opportunity for the NR-U communication, wherein the one or more parameters correspond to one or more consecutively scheduled slots/TTIs, or correspond to a first slot/TTI for following slots/TTIs to be derived therefrom.

Example 19 includes the subject matter of any one or more of Examples 12-18, wherein the one or more processors are further configured to: signal a new data indicator (NDI), a redundancy version (RV), uplink (UL)/supplementary UL (SUL) indicator, a listen before talk (LBT) type, an LBT priority class, a UL starting and ending position, or a maximum channel occupancy time (MCOT) sharing indication.

Example 20 is a computer readable storage device storing executable instructions that, in response to execution, cause one or more processors of a user equipment (UE) to perform operations, the operations comprising: processing one or more slots/time transmission intervals (TTIs); of a multi-slot/TTI scheduling signal to configure an unlicensed band transmission that comprises an hybrid automatic repeat request (HARQ) feedback or a plurality of TTIs; configuring the unlicensed band transmission dynamically with a number of N slots/TTIs, N comprising an integer greater than one, based on a downlink control information (DCI) or a radio resource control (RRC) signaling, comprising the one or more slots/TTIs of the multi-slot/TTI scheduling signal; and transmitting the unlicensed band transmission.

Example 21 includes the subject matter of Example 20, wherein the operations further comprise: process an indication from the one or more slots/TTIs that indicates the number of N slots/TTIs, wherein the one or more slots/TTIs comprises a one or two bit field comprising the indication, and a HARQ process identifier (ID) corresponding to a subframe from which subsequent HARQ IDs for other slots/TTIs are derived to configure the unlicensed band transmission with the HARQ feedback on a plurality of slots/TTIs or the plurality of TTIs.

Examples can include one or more non-transitory computer-readable media comprising instructions to cause an electronic device, upon execution of the instructions by one or more processors of the electronic device, to perform one or more elements of a method described in or related to any of examples above, or any other method or process described herein.

Examples can include an apparatus comprising logic, modules, or circuitry to perform one or more elements of a method described in or related to any of examples above, or any other method or process described herein.

Examples can include a method, technique, or process as described in or related to any of examples above, or portions or parts thereof.

Examples can include an apparatus comprising: one or more processors and one or more computer readable media comprising instructions that, when executed by the one or more processors, cause the one or more processors to perform the method, techniques, or process as described in or related to any of examples above, or portions thereof.

Examples can include a method of communicating in a wireless network as shown and described herein.

Examples can include a system for providing wireless communication as shown and described herein.

Examples can include a device for providing wireless communication as shown and described herein.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.14 (Wi-Fi), IEEE 802.16 (WiMAX), IEEE 802.18, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. An apparatus configured to be employed in a User Equipment (UE) for a new radio (NR) unlicensed (NR-U) communication comprising:
   one or more processors configured to:
      identify a scheduling signal that is related to an uplink (UL) unlicensed band transmission that includes hybrid automatic repeat request (HARQ) feedback that is to be transmitted on a number N of time transmission intervals (TTIs), wherein N is greater than 1, wherein the scheduling signal is based on downlink control information (DCI) signaling or radio resource control (RRC) signaling, and wherein the scheduling signal includes an indication of the number N; and
      configure, based on the scheduling signal, the unlicensed band transmission dynamically with the N TTIs; and
   RF circuitry to transmit the unlicensed band transmission at an earliest UL opportunity that satisfies a processing time from among UL opportunities, wherein the processing time comprises a time for processing orthogonal frequency division multipled (OFDM) symbols from an end of an new radio physical downlink control channel (NR-PDCCH) transmission with a UL grant to a start of a new radio physical uplink shared channel (NR-PUSCH) transmission.

2. The apparatus of claim 1, wherein the scheduling signal includes a bit field with the indication, and a HARQ process identifier (ID) corresponding to a subframe from which subsequent HARQ IDs for other TTIs are derived to configure the unlicensed band transmission with the HARQ feedback.

3. The apparatus of claim 1, wherein the one or more processors are further configured to:
   process a K1 value based on the scheduling signal, wherein the K1 value is semi-statically scheduled or dynamically indicated based on a state of a bit field, and the K1 value indicates a timing related to a downlink data reception and the corresponding HARQ feedback.

4. The apparatus of claim 1, wherein the one or more processors are further configured to:
   process a HARQ-acknowledgement (HARQ-ACK) multiplexed on physical downlink shared channels (PDSCHs) of one or more carriers, wherein the HARQ feedback corresponds to a plurality of DL transmissions in one UL region.

5. The apparatus of claim 1, wherein the one or more processors are further configured to:
   generate a bitmap comprising the HARQ feedback and an implicit association between an index and a HARQ process ID to enable a determination of which physical downlink shared channel (PDSCH) the HARQ feedback is associated with.

6. The apparatus of claim 1, wherein the one or more processors are further configured to:
   configure a window providing multiple opportunities for the unlicensed band transmission to be transmitted based on one or more parameters comprising: a maximum K1 value or a minimum K1 value, wherein a K1 value indicates a timing related to a downlink data reception and the corresponding HARQ feedback, wherein the parameters are received via the RRC signaling, the DCI signaling, or predefined, or by an indication of a window length from a bitmap based on a symbol-level or a slot level granularity.

7. The apparatus of claim 1 wherein respective TTIs of the number N of TTIs vary from among one another based on one or more of: a length, a duration, or a number of symbols among one, or from among slots or TTIs based on composition of symbols or number of TTIs.

8. The apparatus of claim 1, wherein the one or more processors are further configured to:
   process the DCI with the scheduling signal as a bitmap indication that indicates the number N of TTIs in a consecutive order or a non-contiguous order.

9. The apparatus of claim 1, wherein the one or more processors are further configured to:
   configure the unlicensed band transmission dynamically with the number of N TTIs by configuring the plurality of TTIs based on a continuous transmission of a physical uplink shared channel (PUSCH) across continuous symbols of a plurality of slots, or based on a gap within the plurality of slots that divides aggregated transmissions of the PUSCH.

10. The apparatus of claim 1, wherein the one or more processors are further configured to:
configure a first TTI based on a first DCI, and a second TTI differently from the first TTI based on a second DCI that is different from the first DCI, and determining parameters of a configuration for the first TTI or the second TTI based on a predetermined rule, or a reinterpretation of one or more fields or another field for indicating one or more parameters related to a number, a length, a duration, a symbol number or a grouping of TTIs for the N TTIs.

11. An apparatus configured to be employed in a next generation NodeB (gNB) for a new radio (NR) unlicensed (NR-U) communication comprising:
one or more processors configured to:
generate a scheduling signal that is related to an uplink (UL) unlicensed band transmission that includes hybrid automatic repeat request (HARD) feedback that is to be transmitted on a number N of time transmission intervals (TTIs), wherein N is greater than 1, and wherein the scheduling signal includes an indication of the number N; and
generate a downlink control information (DCI) signal that includes the scheduling signal; and
RF circuitry to:
transmit the DCI signal; and
identify, based on the DCI signal, the unlicensed band transmission, wherein the unlicensed band transmission was transmitted at an earliest UL opportunity that satisfies a processing time from among UL opportunities, wherein the processing time comprises a time for processing orthogonal frequency division multipled (OFDM) symbols from an end of an new radio physical downlink control channel (NR-PDCCH) transmission with a UL grant to a start of a new radio physical uplink shared channel (NR-PUSCH) transmission.

12. The apparatus of claim 11, wherein the one or more processors are further configured to:
process a hybrid automatic repeat request (HARQ) feedback comprising a plurality of HARQ processes in a bitmap comprising an index to one or more HARQ process IDs; and
determine which physical downlink shared channel (PDSCH) is associated with the HARQ feedback based on an implicit association of a bit of an index to a HARQ process identifier (ID).

13. The apparatus of claim 11, wherein the one or more processors are further configured to:
generate a multiplex HARQ-acknowledgement (HARQ-ACK) signal or a/HARQ-negative acknowledgement (HARQ-NACK) signal that is multiplexed based on a plurality of physical downlink shared channels (PDSCHs) of one or more carriers; and
provide a plurality of DL transmissions in one UL data or control region to enable a HARQ feedback based on the one UL data or control region.

14. The apparatus of claim 11, wherein the one or more processors are further configured to:
determine whether the HARQ feedback satisfies a processing time;
in response to the HARQ feedback not satisfying the processing time, skip monitoring of the HARQ feedback.

15. The apparatus of claim 11, wherein the one or more processors are further configured to:
indicate one or more parameters of a window that is variable or fixed to enable HARQ ACK or HARQ-NACK feedback in response to a successful Listen Before Talk (LBT) operation, the one or more parameters of the window comprising at least one of: a start, an end, a length, a duration, a maximum value, or a minimum value that enables the window to include multiple opportunities for the HARQ ACK/NACK feedback to be transmitted on the NR-U transmission.

16. The apparatus of claim 11, wherein the one or more processors are further configured to:
generate the DCI with an indication that corresponds to one or more different TTIs within a slot or a plurality of slots that are consecutive to one another, wherein the indication indicates one or more parameters related to a number, a length, a duration, a symbol number or a grouping of TTIs for one or more slots, and wherein the DCI is generated in a physical downlink control channel (PDCCH) that schedules a physical uplink shared channel (PUSCH) transmission continuously across a plurality of slots of a maximum channel occupancy time (MCOT) or where each slot of the plurality of slots corresponds to a different PDCCH at a beginning of the slot.

17. The apparatus of claim 11, wherein the one or more processors are further configured to:
configure one or more fields of the DCI comprising one or more of: a carrier indictor field (CIF), a bandwidth part (BWP) indicator, a frequency or time resource allocation (RA), a modulation coding scheme (MCS), a virtual resource block (VRB) to physical resource block (PRB) mapping, a frequency hopping flag, a multiple input and multiple output (MIMO) parameter, antenna port field, a code block group (CBG) transmission information, a transmit power control (TPC), a sounding reference signal (SRS) request, a channel state information (CSI) request, or a demodulation reference signal (DMRS) sequence initialization to indicate one or more parameters related to the plurality of TTIs within a transmission opportunity for the NR-U communication, wherein the one or more parameters correspond to one or more consecutively scheduled TTIs, or correspond to a first TTI for following TTIs to be derived therefrom.

18. The apparatus of claim 17, wherein the RF circuitry is further configured to:
signal a new data indicator (NDI), a redundancy version (RV), uplink (UL) or supplementary UL (SUL) indicator, a listen before talk (LBT) type, an LBT priority class, a UL starting and ending position, or a maximum channel occupancy time (MCOT) sharing indication.

19. A computer readable storage device storing executable instructions that, in response to execution, cause one or more processors of a user equipment (UE) to perform operations, the operations comprising:
identify a scheduling signal that is related to an unlicensed band transmission that includes a hybrid automatic repeat request (HARD) feedback that is to be transmitted on a number N of time transmission intervals (TTIs), wherein N is greater than 1, wherein the scheduling signal is to be carried on downlink control information (DCI) signaling or radio resource control (RRC) signaling, and wherein the scheduling signal includes an indication of the number N;

configure, based on the scheduling signal, the unlicensed band transmission dynamically with N TTIs; and transmit the unlicensed band transmission at an earliest UL opportunity that satisfies a processing time from among UL opportunities, wherein the processing time includes a time for processing orthogonal frequency division multipled (OFDM) symbols from an end of an new radio physical downlink control channel (NR-PDCCH) transmission with a UL grant to a start of a new radio physical uplink shared channel (NR-PUSCH) transmission.

* * * * *

UNITED STATES PATENT AND TRADEMARK OFFICE
CERTIFICATE OF CORRECTION

PATENT NO. : 11,277,883 B2
APPLICATION NO. : 16/406528
DATED : March 15, 2022
INVENTOR(S) : Salvatore Talarico et al.

It is certified that error appears in the above-identified patent and that said Letters Patent is hereby corrected as shown below:

In the Claims

Column 31
Line 54, remove the "/" after "signal or a" and before "HARQ-negative acknowledgement".

Column 32
Line 31, correct "indictor" before "a carrier" to "indicator".

Column 30
Line 9, correct "an new" after "an end of" to "a new".

Column 31
Line 37, correct "an new" before "radio physical downlink" to "a new".

Column 33
Line 7, correct "an" after "an end of" to "a".

Signed and Sealed this
Fourteenth Day of June, 2022

Katherine Kelly Vidal
*Director of the United States Patent and Trademark Office*